H. A. FOOTHORAP

Nov. 29, 1932. Re. 18,674

REGISTER

Original Filed May 3, 1924 5 Sheets-Sheet 1

Inventor,
Harry A. Foothorap.
By L. G. Jaeker
Attorney

Nov. 29, 1932.

H. A. FOOTHORAP

REGISTER

Re. 18,674

Original Filed May 3, 1924 5 Sheets-Sheet 2

Inventor,
Harry A. Foothorap.

By L. G. Julian
Attorney

H. A. FOOTHORAP

Nov. 29, 1932. Re. 18,674

REGISTER

Original Filed May 3, 1924 5 Sheets-Sheet 3

Inventor,
Harry A. Foothorap.
By L. G. Jaleh
Attorney

H. A. FOOTHORAP

Nov. 29, 1932.

Re. 18,674

REGISTER

Original Filed May 3, 1924 5 Sheets-Sheet 4

Invento

Harry A. Foothorap.

By L. G. Jaeke

Attorney

H. A. FOOTHORAP

Nov. 29, 1932. Re. 18,674

REGISTER

Original Filed May 3, 1924 5 Sheets-Sheet 5

Inventor,
Harry A. Foothorap.
By L. G. Julian
Attorney

Reissued Nov. 29, 1932

Re. 18,674

UNITED STATES PATENT OFFICE

HARRY A. FOOTHORAP, OF HARRISBURG, PENNSYLVANIA, ASSIGNOR TO ELLIOTT-FISHER COMPANY, A CORPORATION OF DELAWARE

REGISTER

Original No. 1,576,961, dated March 16, 1926, Serial No. 710,803, filed May 3, 1924. Application for reissue filed April 25, 1931. Serial No. 532,968.

This invention relates to computing mechanisms, particularly of the type known as cross footing registers for writing adding machines.

The object of the invention is to provide a register with a toggle locking two way carrying or transfer mechanism and to associate therewith a resetting mechanism conforming to the requirements of a register of the type disclosed in my Patent No. 1,455,196.

To the accomplishment of this general object and others subordinate thereto, one embodiment of the invention resides in the construction and arrangement of parts hereinafter fully described and illustrated in the accompanying drawings.

The particular machine, an embodiment of which is under consideration, is the Elliott-Fisher bookkeeping machine of commerce. This machine is of the class known as flat platen typewriters equipped with adding mechanism consisting of column registers and a cross footing register. The column registers are associated with different columns of the work sheet and the cross footing register is common to any or all of the columns, provision being made for its operation, for either addition or subtraction, simultaneous with the operation of different column registers.

Figure 1:
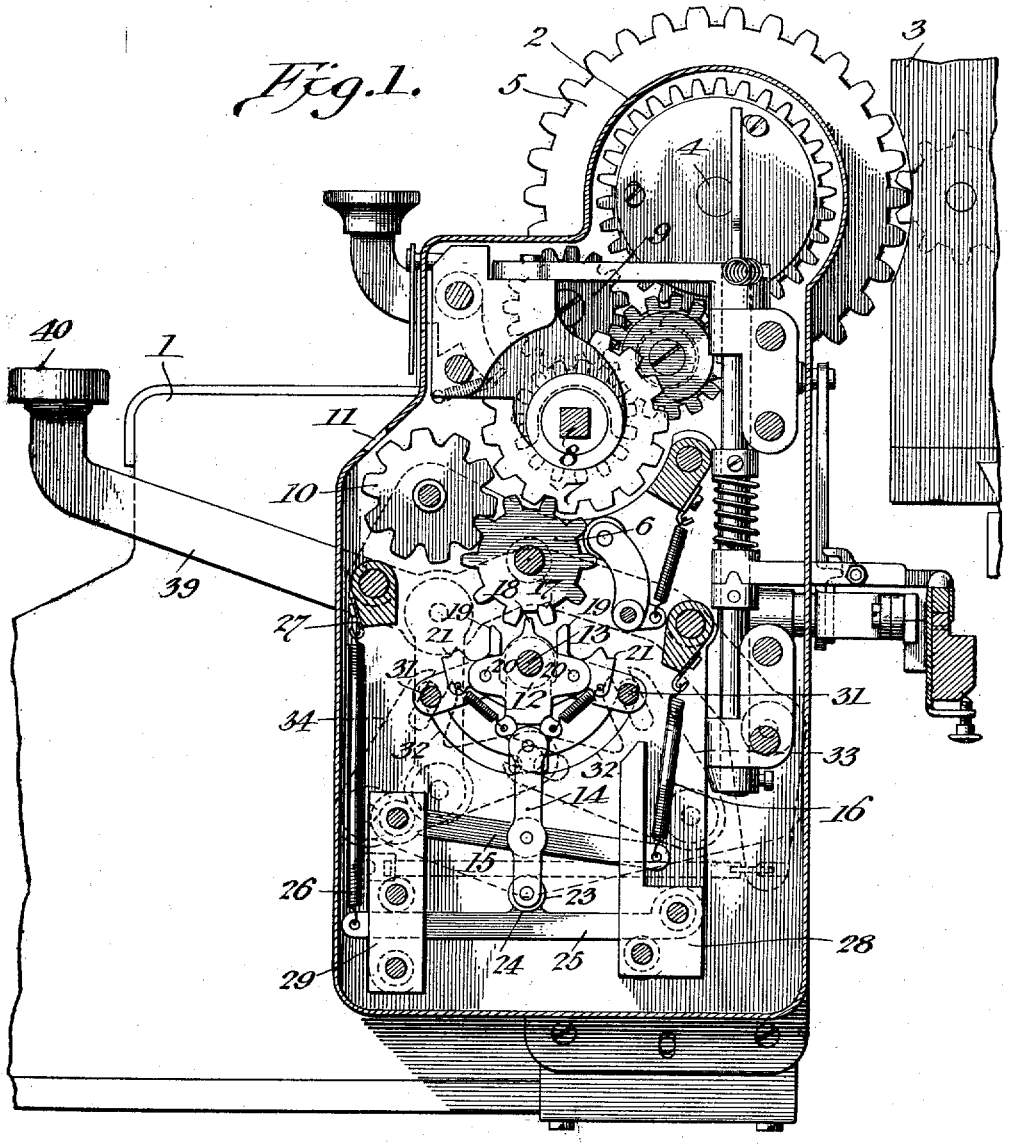
Fig. 1 is a vertical section through a cross footing register constructed in accordance with my invention.

The general assemblage is shown in Fig. 1 wherein 1 indicates the traveling carriage on which the keys and printing mechanism are mounted, 2, the cross footing register mounted on and movable with the carriage, and 3, one of the column registers mounted on a relatively fixed register bar in rear of the carriage.

The cross footer register and the column register are operated simultaneously from keys (not shown) which, through intermediate mechanism, operate a master wheel shaft 4 on which is mounted a master wheel 5 presented to successive number wheels of the column register as the carriage moves from one denomination to another and rotated different distances by the keys according to their numerical value. Thus as digits are printed in a column the corresponding number wheels of the column register are operated to an extent determined by the value of the printed digits.

Mounted in the casing of the cross footer 2 is a series of number wheels 6 occupying different denominational positions and operated by a master wheel 7 movable longitudinally of a squared shaft 8 geared to the shaft 4 by variable gearing 9. This gearing 9 serves to transmit motion from the shaft 4 to the master wheel shaft 8 of the cross footer in either of two directions for the purpose of operating the number wheels 6 for addition or subtraction through the master wheel 7.

Geared to the denominational members or number wheels 6 is a series of indicating wheels 10, the digits on the peripheries of which are exhibited at a sight opening 11 in the cross footer casing.

Directly below the number wheels 6 is mounted a series of carrying or transfer devices, each of which includes a carrying head 12 having a fixed axis on a shaft 13, and a link 14 pivoted to the lower end of the head and to an operating lever 15 urged in one direction by a suitable motor, as for instance, a spring 16. The relation of the parts is such that normally the pivotally connected members 12 and 14 of each carrying device are disposed in alignment with the axis 13 which acts as a dead center opposing the power exerted by the spring 16. In this normal relation of the parts the carrying devices constitute toggle locks which nullify the motor springs 16 so that each carrying device normally occupies a central position. As soon, however, as a carrying device is broken or flexed in either direction from this central position, the dead center relation of the parts is destroyed and the motor spring becomes effective to swing the head 12 and thereby effect the carrying operation.

This initial flexing of the carrying device is accomplished by the adjacent number wheel 6, one tooth of which is widened to form a carrying lug 17 which engages a trip 18 extended upwardly from the head 12. On the head, and mounted at opposite sides of the axis thereof, is a pair of carrying fingers 19 pivoted at 20 and having associated therewith, locking dogs 21. Each combined finger and locking dog yields in one direction against the resistance of a spring 22, but by reason of engagement with the side of the head 12 is unyielding relatively to the head in the opposite direction.

This construction and arrangement of the carrying devices results, when the number wheel moves from "9" to "0" in addition or from "0" to "9" in subtraction, in the engagement of the lug 17 with the trip 18 and in the flexing or breaking or tripping of the carrying device in one direction or the other. The motor spring 16 becomes effective to complete the carrying operation through the engagement of one of the dogs 19 with the next higher number wheel as soon as the alignment of the elements 12 and 14 is disturbed. The members 14 are extended below the operating levers 15 and are provided at their lower ends with rollers 23 which engage arcuate depressions 24 in detent levers 25 urged in the holding direction by springs 26 attached to a hook bar 27 and at their lower ends to the extremities of the detents 25 which are fulcrumed in a bearing block 28 and are guided both by said block and a second bearing block 29.

Figure 6:
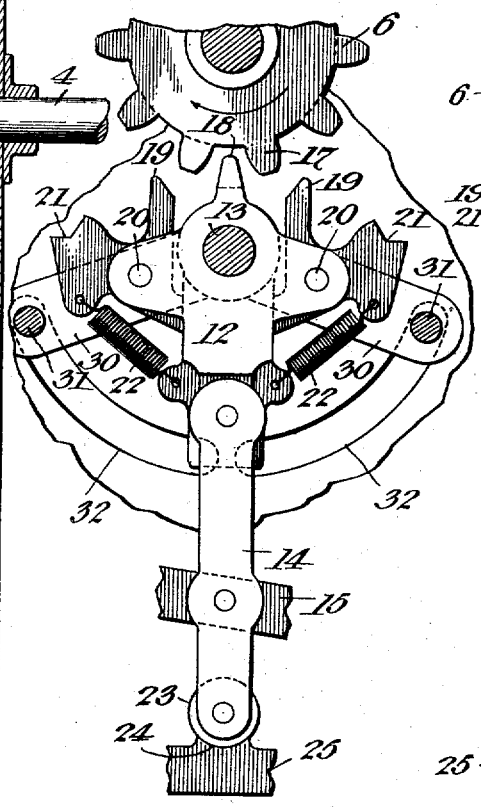
Fig. 6 is a side elevation of one of the carrying devices and immediately associated parts.
Figure 7:
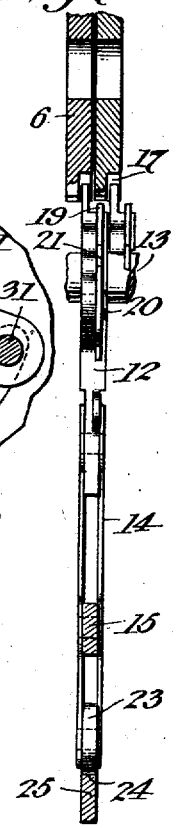
Fig. 7 is a sectional elevation of the subject matter of Fig. 6.
Figure 8:
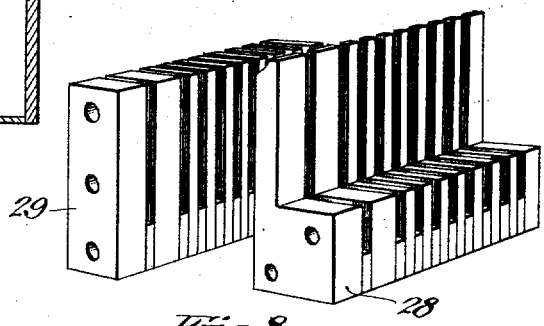
Fig. 8 is a detail perspective view of the two bearing blocks.
Figure 9:
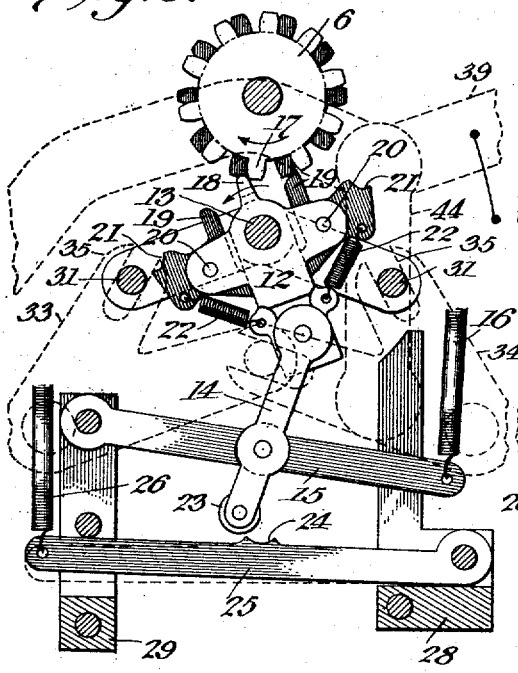
Figs. 9 and 10 are detail sectional views showing the carrying mechanism at different stages of the carrying operation, the normal positions of certain parts of the resetting mechanism being indicated in dotted lines.

The resetting of the carrying devices and the restoration of the motor springs to normal tension is accomplished by resetting mechanism which includes two resetting yokes 30 (see Fig. 6), the transverse resetting bars 31 of which extend across the entire series of carrying devices at opposite sides thereof.

Figure 2:
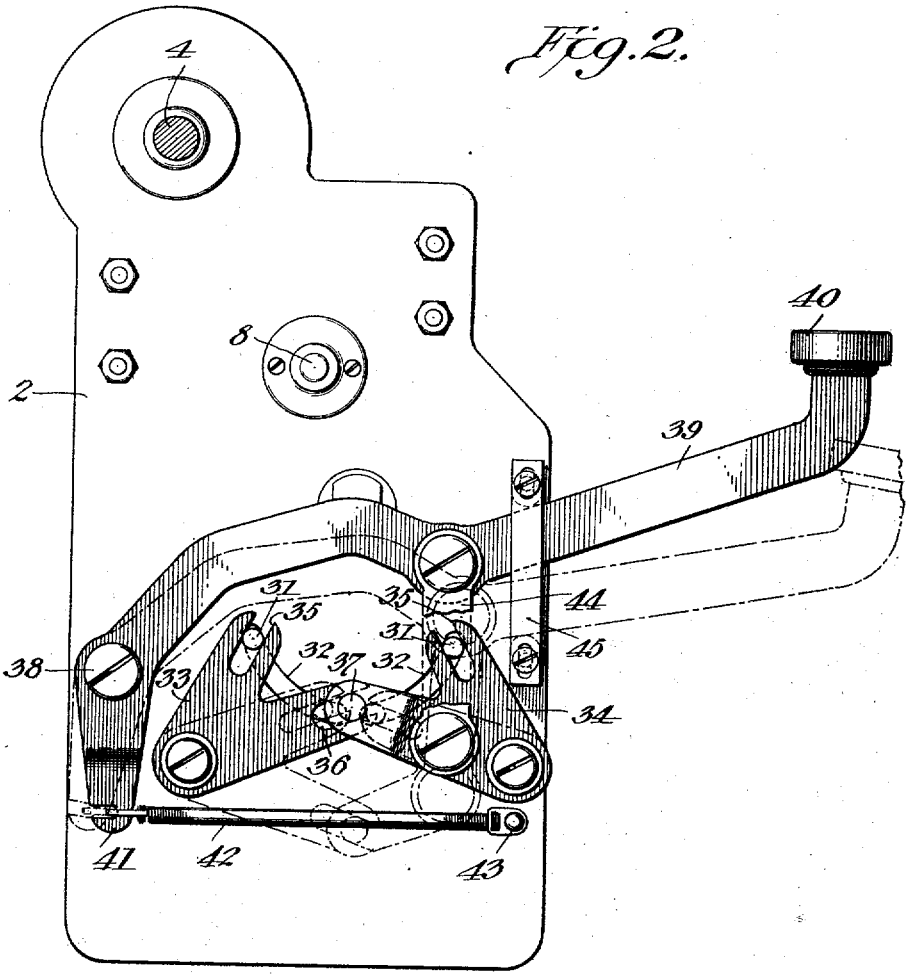
Fig. 2 is a side elevation of the register showing elements of the resetting mechanism mounted on the exterior thereof.
Figure 3:
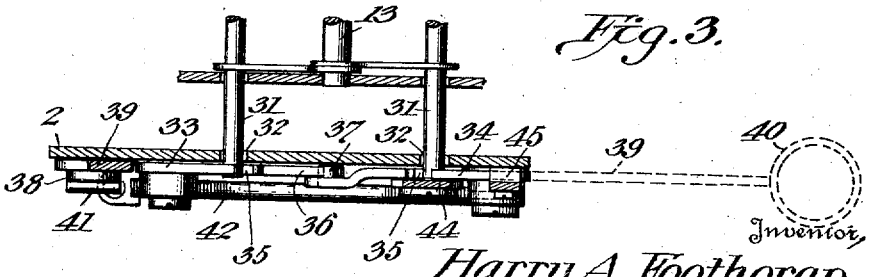
Fig. 3 is a detail section of the structure shown in Fig. 2.
Figure 4:
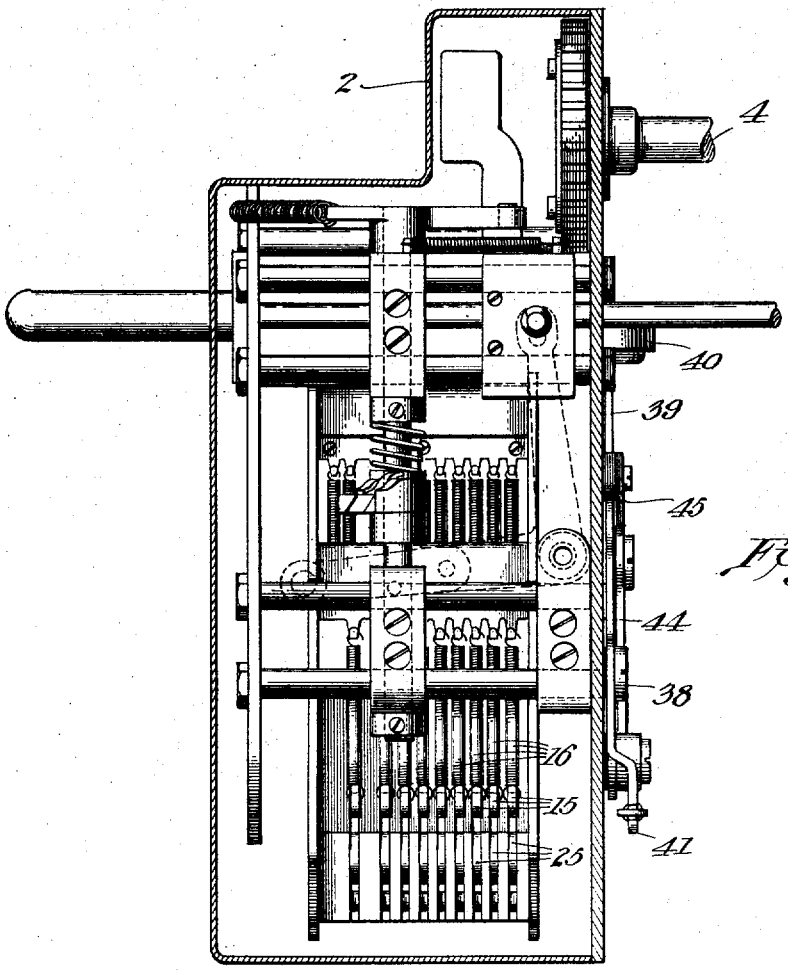
Fig. 4 is a rear view of the register with the casing in section.
Figure 5:
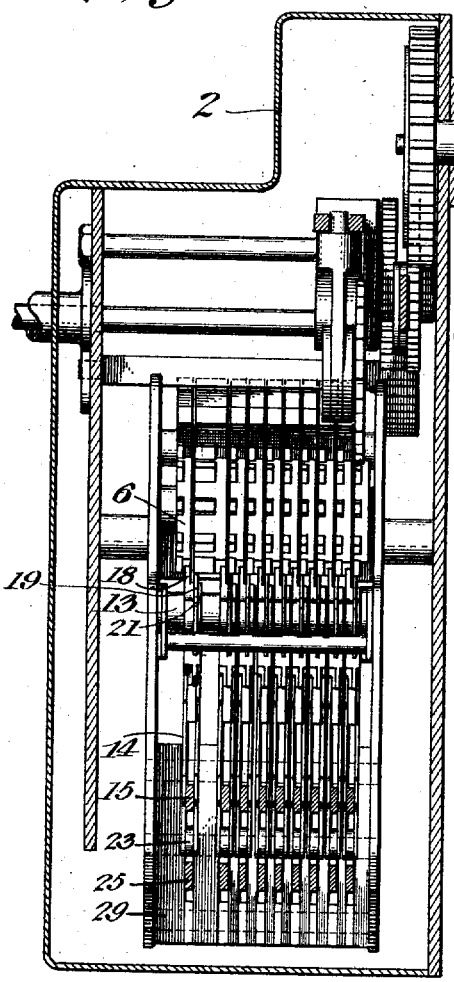
Fig. 5 is a vertical section through the register.

The yokes 30 are swung from the shaft 13 and the walls of the casing are formed with arcuate slots 32 accommodating the movement of the bars 31, and through which said bars extend to the exterior of the casing (see Fig. 2). Fulcrumed on the exterior of the cross footer casing are two oppositely disposed bell cranks 33 and 34 having bifurcated ends 35 engaging the ends of the resetting bars 31. The opposite ends of the bell cranks overlap, as shown in Fig. 2, one being bifurcated or slotted, as indicated at 36, to engage a pin 37 on the other. This slot and pin connection compels the bell cranks to move in unison, but in opposite directions. Also fulcrumed upon the exterior of the cross footer at 38 is a resetting lever 39 terminating at one end in a resetting key 40, and at its opposite end in a hook 41 for the attachment of a spring 42 secured at its opposite end to the casing, as shown at 43. A link 44 is dropped from the lever 39 and is connected to the bell crank 34 as shown. 45 is a guide for the lever 39.

Figure 10:
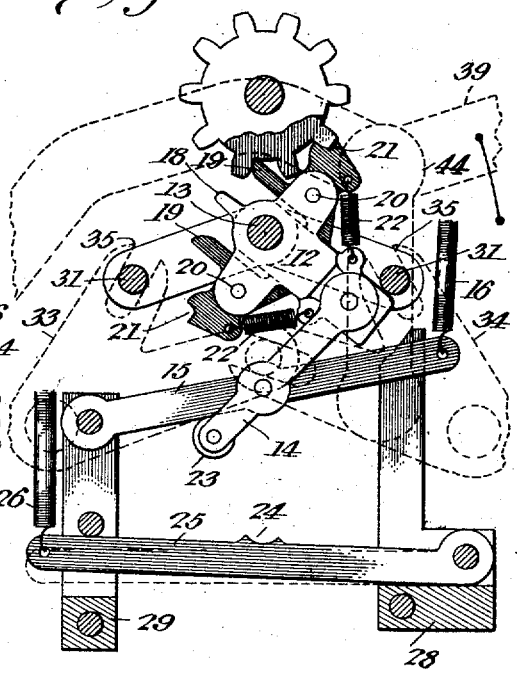
Figure 11:
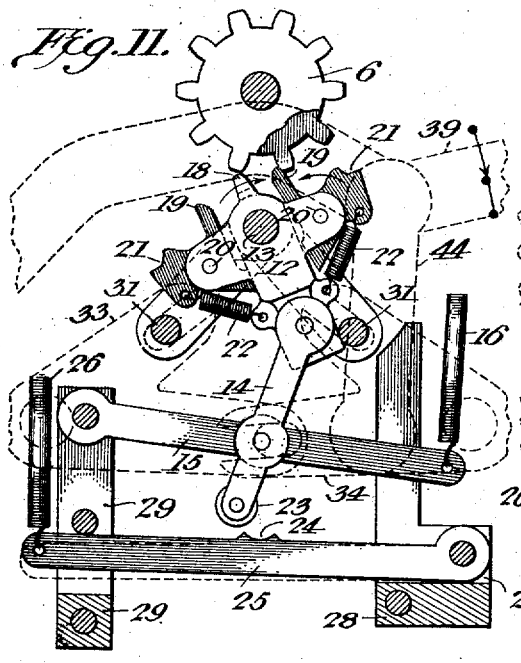
Figs. 11 and 12 are similar views of the carrying mechanism during and after resetting, with the elements of the carrying mechanism in different positions assumed by them when operated to reset the carrying mechanism.
Figure 12:
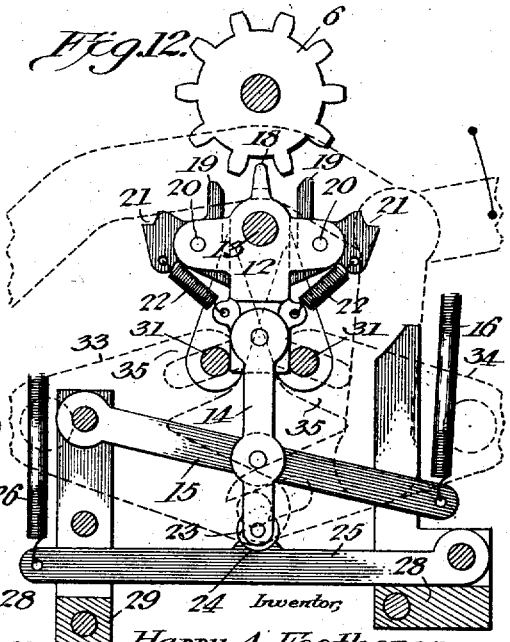

It will now be seen that when the carrying mechanism has been operated and occupies the position shown in Fig. 10 or a similar position at the other side of the center, it will be retracted to its normal central position by the simultaneous swinging of the resetting yokes 30, the setting bars of which move toward the center line of the carrying devices and thus restore them to dead center relation, regardless of which way they have been flexed or operated. This swinging movement of the resetting yokes is effected by the depression of the key 40, which, through the intermediate link 44, will cause the two connected bell cranks 33 and 34 to swing toward each other and thus swing the yokes to which they are connected.

When the carrying devices have been reset, the release of the key 40 will retract the resetting mechanism and as the motor springs 16 have been restored to normal tension and the members 14 again engage with the detents 25, the mechanism will be in condition for a reoperation.

From the foregoing, the construction and operation of the illustrated embodiment of the invention will be clearly understood, but I reserve the right to effect such modifications thereof as may fall within the scope of the claims.

What I claim is:

1. The combination with denominational members, of carrying mechanism operative to effect a transfer from one member to the other and including normally aligned, pivotally connected members, a motor exerting its force longitudinally of said members and resisted by such relation of the members, and means operated by a denominational member to disturb the aligned relation of the members and to permit the motor to become effective to increase the angular relation of the members and effect the carrying operation.

2. The combination with denominational members, of carrying mechanism operative to effect a transfer from one member to the other and including a head mounted to swing in either of two directions and provided at opposite sides of its axis with one way carrying devices, either of which is disposed to engage and carry another denominational member and individually movable on the head to an ineffective position by engagement with the carried member.

3. The combination with denominational members, of carrying mechanism operative to effect a transfer from one member to the other and including a rocking carrying head cooperatively related to one denominational member and carrying fingers mounted on the head at opposite sides of the axis thereof and for rocking movement only to engage and operate another denominational member, said carrying fingers being individually yieldable to facilitate the retraction of the head.

4. The combination with denominational members, of carrying mechanism operative to effect a transfer from one member to the other and including a head mounted to swing from a normal position on a fixed axis, a lever movable to swing the head and a link connection between the lever and head blocking movement of the lever when the head is in normal position.

5. The combination with denominational members, of carrying mechanism operative to effect a transfer from one member to the other and including two normally aligned pivotally connected members, one of which has a fixed axis, a lever connected to the other member, and means for applying power to the lever.

6. The combination with denominational members, of carrying mechanism operative to effect a transfer from one member to the other and including two pivotally connected members, a motor spring and a lever operated by the motor spring, one of said members being movable about a fixed axis and the other of said members having pivotal connection with the lever and being movable with the first member about said axis, the force exerted by the lever being normally exerted against the fixed axis as a dead center.

7. The combination with denominational members, of carrying mechanism operative to effect a transfer from one member to the other and including two normally aligned pivotally connected members, one of which has a fixed axis and a carrying device, an operating lever having pivotal connection with the other member but normally exerting its force against the fixed axis as a dead center, and means whereby a denominational member will cause the members of the carrying mechanism to be moved out of alignment and thereby permit the operating lever to become effective to complete the carrying operation.

8. The combination with denominational members, of carrying mechanism operative to effect a transfer from one member to the other and including a carrying head having a fixed axis and cooperatively related to a number wheel to be slightly swung by said wheel, an operating lever, a motor spring therefor and a link connecting the operating lever with the head, the connections of the link with the lever and the head respectively, being normally aligned with the fixed axis of the head and bearing such relation to the operating lever that the power exerted by the motor spring will normally be resisted by a said fixed axis but will become effective to complete the carrying operation after the head has been moved slightly in either direction to destroy the dead center relation of the parts.

9. The combination with denominational members, of carrying mechanism operative to effect a transfer from one member to the other and including a head movable on a fixed axis to carry for both addition and subtraction, an operating lever and motor spring connected to the operating lever, a link connecting the operating lever with the head and forming with said head a toggle lock resisting the action of the motor spring, and a detent tending to retain the parts in normal position.

10. The combination with denominational members, of carrying mechanism operative to effect a transfer from one member to the other and including members having the normal relation of a toggle lock, and a floating pivotal connection, and a motor for operating said members but normally resisted by said toggle lock.

11. The combination with denominational members, of carrying mechanism operative to effect a transfer from one member to the other and including a head having a fixed axis, a power urged operating lever and a link connection between said lever and the head, the link connections being normally aligned with the fixed axis of the head to form a toggle lock resisting the power, and means whereby a denominational member will move the head slightly in either direction to break the toggle lock and thereby remove the resistance to the power operation of the carrying mechanism.

12. The combination with denominational members, of carrying mechanism operative to effect a transfer from one member to the other and including a motor spring and members operated thereby and pivotally connected together in end to end relation to assume a toggle lock relation which resists the power of the spring, means whereby a denominational member will effect the breaking of the toggle lock to permit the operation of the carrying mechanism, and means to restore the power expended by the spring and the toggle lock relation of the parts.

13. The combination with denominational members, of carrying mechanism operative to effect a transfer from one member to the other and including carrying heads movable in either of two directions from a central normal position to effect carrying for subtraction or addition, a pair of simultaneously operated resetting devices movable toward each other to center the heads therebetween for restoring the carrying mechanism to normal position from either operated position, and means for operating said devices.

14. In combination, a denominational member, a two way carrying device therefor having a continuous carrying movement in a single direction, a second denominational member and a means acting in succession to impart such carrying movement to the carrying device, said means including, a motor, and pivotal connections only between the motor and carrying device.

15. The combination with denominational members, of carrying mechanism operative to effect a transfer from one member to the other and including a series of rocking carrying heads movable in either of two directions from a central normal position, a pair of resetting yokes movable to center the heads therebetween to restore the carrying devices to normal position, levers connected to the yokes, and means for swinging said levers.

16. The combination with denominational members, of carrying mechanism operative to effect a transfer from one member to the other and including two normally aligned pivotally mounted members one of which has a fixed axis, a lever connected to the other member, and means for applying power to said lever.

17. The combination with denominational members, of two-way carrying mechanism operative to effect a transfer from one member to the other and including a carrying head movable on a fixed axis in opposite directions, respectively, and effecting a carrying operation by continuous movement in a single direction, means whereby one denominational member will move the head slightly, and a motor arranged to complete the operation of the head.

18. In a mechanism of the character described, the combination with carrying devices, of bearing blocks located at opposite sides thereof, operating levers and detents fulcrumed in their respective bearing blocks and each guided by both blocks, and springs connected to said levers and detents.

19. In a mechanism of the character described, the combination with a carrying mechanism and bearing blocks located at opposite sides thereof, of operating levers fulcrumed in one of the bearing blocks and guided by the other, detent levers fulcrumed in the last named block and guided by the block first named, and springs connected to the free ends of the levers and detents and located outside of the bearing blocks.

20. In a mechanism of the character described, the combination with carrying mechanism movable in either of two directions from a central position, resetting yokes for said carrying mechanism, bell cranks directly connected to each other and to the yokes, and a resetting lever for operating the bell cranks.

21. In a mechanism of the character described, the combination with carrying devices and resetting yokes therefor, of connected bell cranks for operating the yokes, a key connected to the bell cranks to operate the same, and means for retracting the key.

22. In a mechanism of the character described, the combination with carrying mechanism and a pair of resetting yokes therefor, of oppositely disposed bell cranks directly connected to each other and to the yokes, a resetting lever, a link connecting the resetting lever to one of the bell cranks, and means for retracting the resetting lever.

23. In a mechanism of the character described, the combination with a casing, of carrying mechanism within the casing, a pair of resetting yokes also within the casing but extended outside thereof, a pair of bell cranks mounted outside of the casing and engaging the yokes, means connecting the bell cranks to compel their movement in unison but in opposite directions, and a resetting key for operating the bell cranks.

24. In a mechanism of the character described, the combination with a casing having arcuate slots in a wall thereof, of carrying mechanism within the casing, resetting yokes cooperating with the carrying mechanism and including resetting bars extended through the slots in the casing, connected levers mounted on the exterior of the casing and engaging the resetting bars, and a resetting key for operating said levers.

25. In a mechanism of the character described, the combination with a casing having arcuate slots in one wall thereof, a carrying mechanism within the casing, resetting yokes cooperating with the carrying mechanism and including resetting bars extended through the arcuate slots, bell cranks fulcrumed on the outside of the casing and connected to each other and to the resetting bars, a resetting lever mounted on the casing and connected to one of the bell cranks, and means for retracting the lever.

26. In a mechanism of the character described, the combination with a casing having arcuate slots in one wall thereof, a carrying mechanism within the casing, resetting yokes cooperating with the carrying mechanism and including resetting bars extended through the arcuate slots, bell cranks fulcrumed on the outside of the casing and connected to each other and to the resetting bars, a resetting lever mounted on the casing, a link connecting the resetting lever with one of the bell cranks, and a retracting spring for the resetting lever.

27. In a mechanism of the character described, the combination with a casing having arcuate slots in one wall thereof, a carrying mechanism within the casing, resetting yokes cooperating with the carrying mechanism and including resetting bars extended through the arcuate slots, bell cranks fulcrumed on the outside of the casing and connected to each other and to the resetting bars, a resetting lever mounted on the casing, a link connecting the resetting lever with one of the bell cranks, a retracting spring for the resetting lever, and a resetting key for operating the lever.

28. The combination with spaced bearing and guide blocks, of a set of operating levers and a set of detent levers, each set of levers being mounted in one block and guided by the other block, denominational members, and carrying mechanism therefor cooperating intermediate of the blocks with both sets of levers.

In testimony whereof I hereunto affix my signature.

HARRY A. FOOTHORAP.